United States Patent
Wang et al.

(10) Patent No.: US 11,334,135 B1
(45) Date of Patent: May 17, 2022

(54) POWER SUPPLY OPTIMIZATION USING BACKUP BATTERY POWER SUPPLEMENTATION

(71) Applicant: Amazon Technologies, Inc., Seattle, WA (US)

(72) Inventors: Ligong Wang, Seattle, WA (US); Darin Frink, Lake Tapps, WA (US)

(73) Assignee: Amazon Technologies, Inc., Seattle, WA (US)

( * ) Notice: Subject to any disclaimer, the term of this patent is extended or adjusted under 35 U.S.C. 154(b) by 104 days.

(21) Appl. No.: 16/368,333

(22) Filed: Mar. 28, 2019

(51) Int. Cl.
G06F 1/30 (2006.01)
H02J 7/00 (2006.01)
H02J 9/06 (2006.01)
H02J 7/34 (2006.01)

(52) U.S. Cl.
CPC .............. G06F 1/30 (2013.01); H02J 7/0068 (2013.01); H02J 9/061 (2013.01); H02J 7/345 (2013.01)

(58) Field of Classification Search
None
See application file for complete search history.

(56) References Cited

U.S. PATENT DOCUMENTS

| | | | | |
|---|---|---|---|---|
| 6,813,897 B1* | 11/2004 | Bash | ...................... | G06F 1/206 62/175 |
| 2010/0037078 A1* | 2/2010 | Gross | .................... | G06F 1/3203 713/340 |
| 2010/0241890 A1* | 9/2010 | Goodart | ................ | G06F 1/3203 713/340 |
| 2011/0175452 A1* | 7/2011 | Hoshino | ................. | H02J 9/005 307/66 |
| 2012/0086276 A1* | 4/2012 | Sawyers | .................... | H02J 1/12 307/66 |
| 2012/0303993 A1* | 11/2012 | Nishtala | .................... | G06F 1/28 713/340 |
| 2014/0095903 A1* | 4/2014 | Muccini | ................. | G06F 1/263 713/320 |
| 2014/0208129 A1 | 7/2014 | Morales et al. | | |
| 2015/0121113 A1* | 4/2015 | Ramamurthy | .......... | H02J 9/062 713/340 |
| 2015/0270745 A1* | 9/2015 | Ogura | ..................... | H02J 9/061 307/66 |
| 2015/0309951 A1* | 10/2015 | Breakstone | ............ | G05B 11/01 710/313 |
| 2016/0285267 A1* | 9/2016 | Stone | ........................ | H02J 3/32 |
| 2018/0059754 A1* | 3/2018 | Shaikh | ....................... | G06F 1/28 |
| 2019/0067958 A1* | 2/2019 | Zimnicki | ................ | H03F 3/187 |
| 2019/0094951 A1* | 3/2019 | Mori | ....................... | H02M 3/04 |

(Continued)

OTHER PUBLICATIONS

U.S. Appl. No. 16/457,334, "Power Supply Shedding for Power Efficiency Optimization", filed Jun. 28, 2019.

*Primary Examiner* — Danny Chan
(74) *Attorney, Agent, or Firm* — Kilpatrick Townsend & Stockton LLP

(57) ABSTRACT

Methods and systems for controlling distribution of a main power supply and backup power supply can include detecting an output load on the main power supply from one or more electronic devices in excess of a threshold, which may correspond to a high efficiency band of the main power supply, and causing a backup power supply to provide an amount of supplemental power to the one or more electronic devices based in part on a difference between the output load and the threshold.

19 Claims, 11 Drawing Sheets

(56) References Cited

U.S. PATENT DOCUMENTS

2019/0237996 A1* 8/2019 Kurk .................. H02J 7/34
2019/0272012 A1* 9/2019 Kachare ............ G06F 1/3287
2020/0133379 A1* 4/2020 Muccini ............. G06F 1/30

* cited by examiner

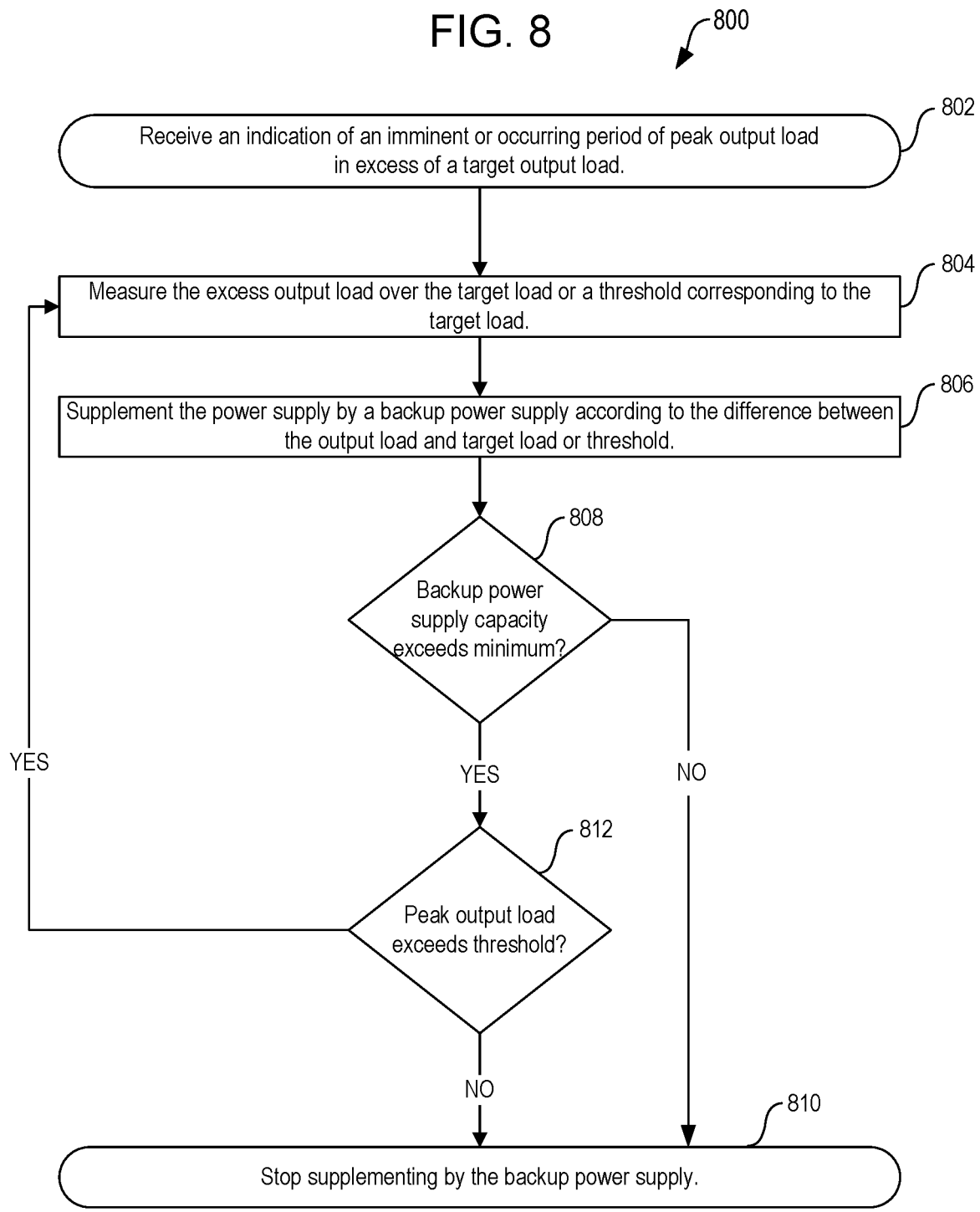

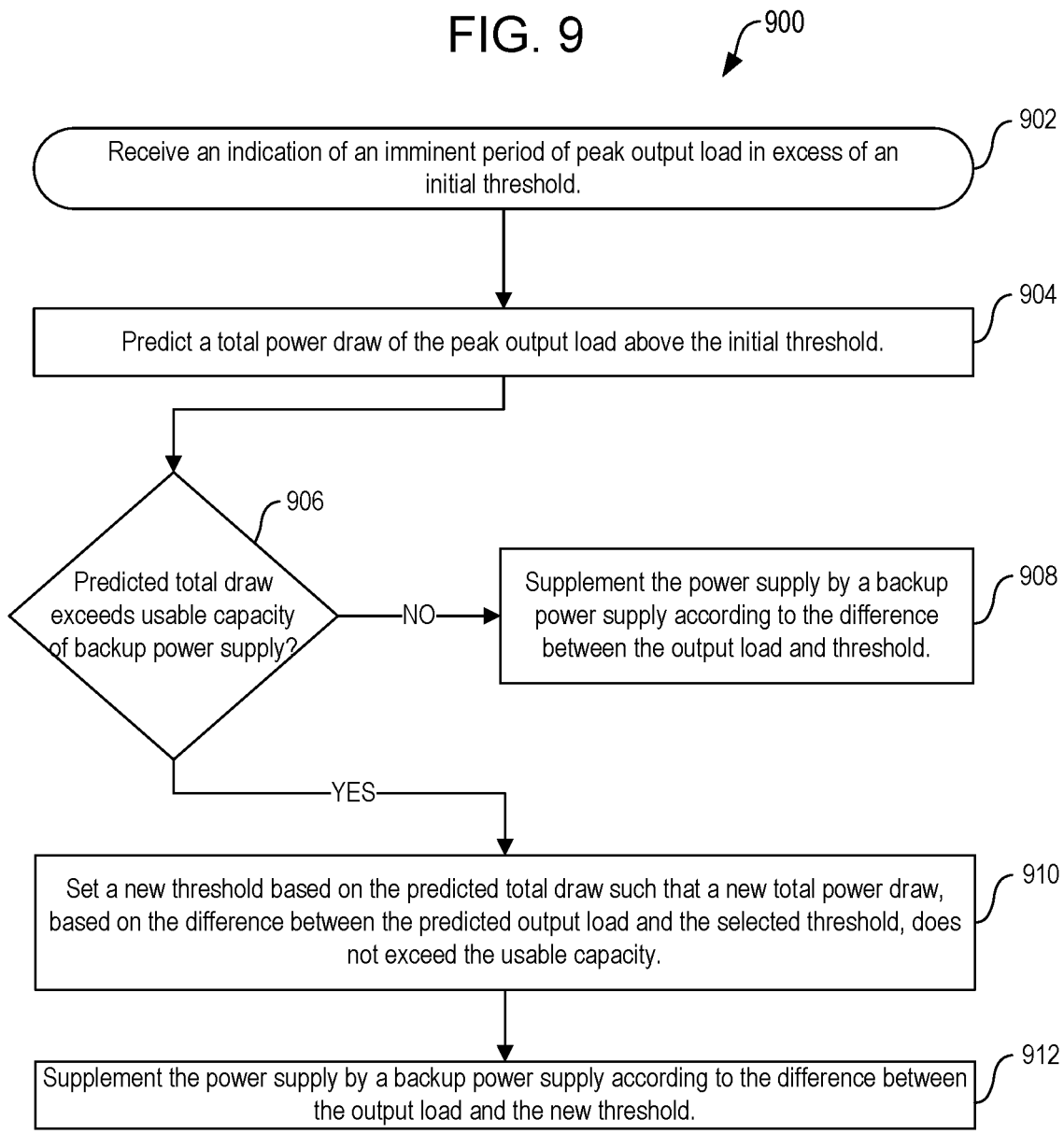

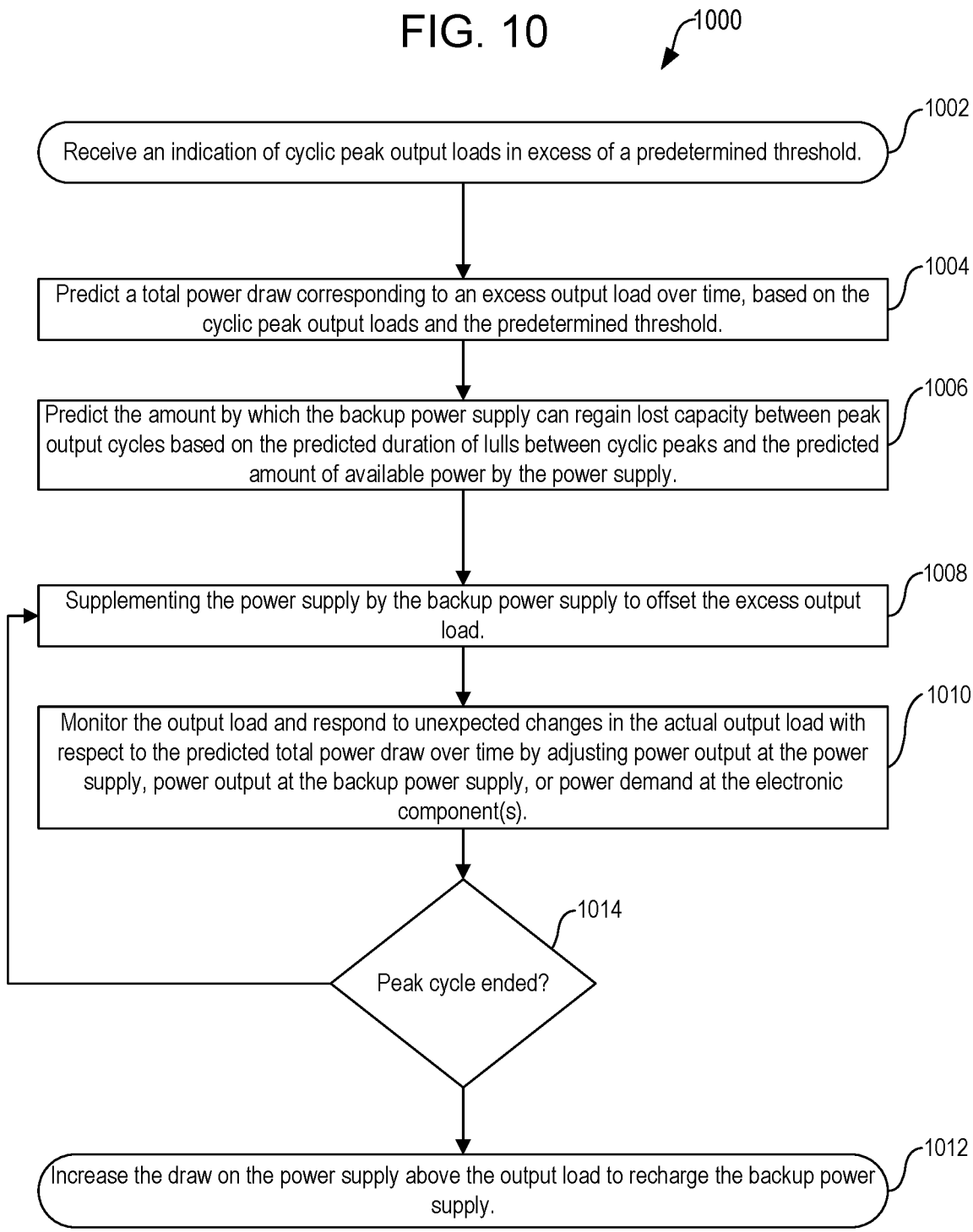

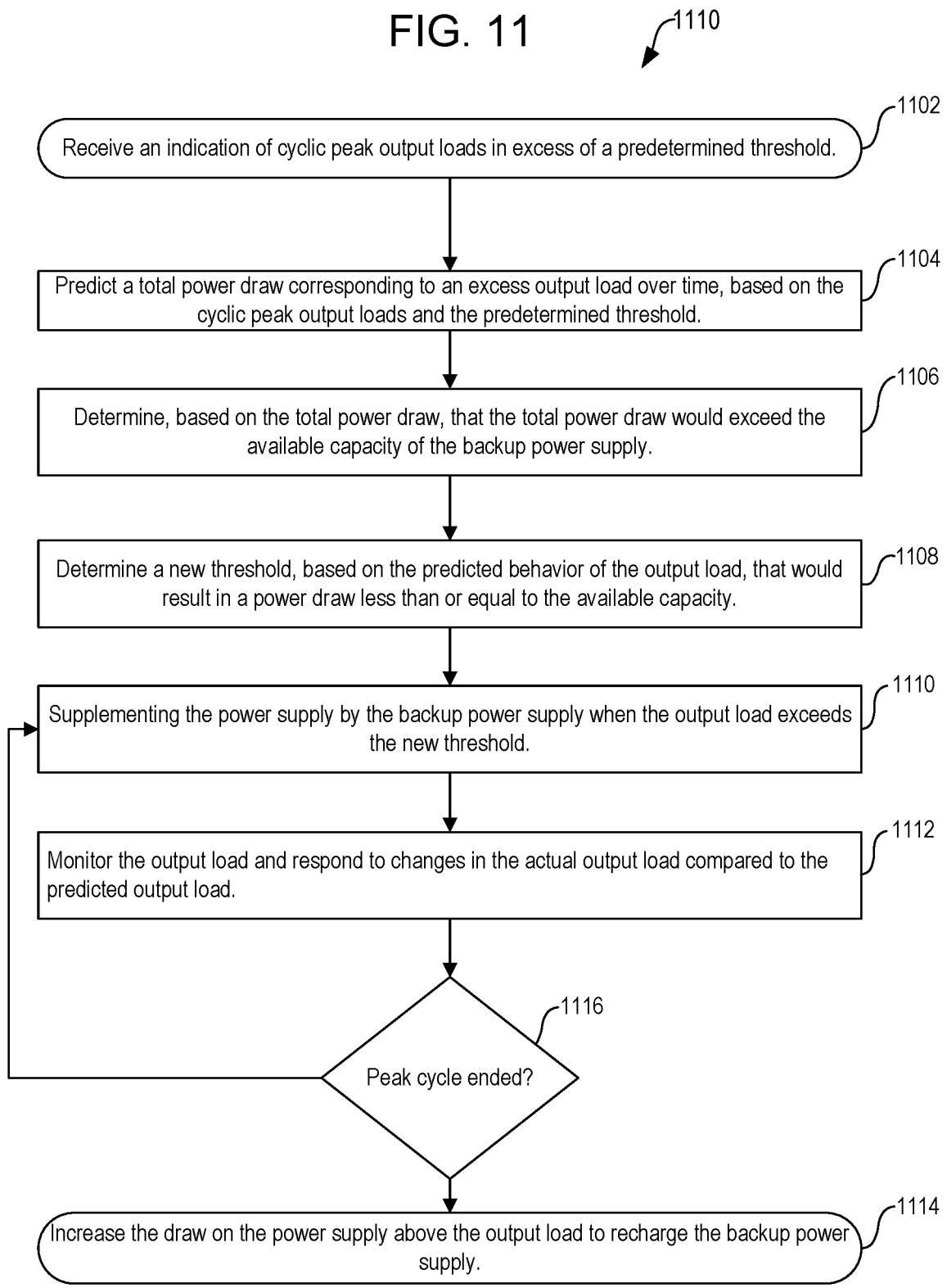

POWER SUPPLY OPTIMIZATION USING BACKUP BATTERY POWER SUPPLEMENTATION

BACKGROUND

A datacenter typically contains a collection of computer servers and components for the management, operation, and connectivity of those servers. Power is generally supplied to such components by sources of externally-supplied power, and can also be provided by short-term backup power solutions such as backup battery units (BBUs) or supercapacitors to prevent data loss during power loss events. Externally-supplied power, which is typically a high-voltage AC power source, is converted to DC power and stepped appropriately in current and voltage before it can be utilized by most datacenter components. These power conditioning steps can have varying degrees of inefficiency depending on the power supply and load, resulting in efficiency losses that are variable depending on output load. Therefore, additional methods of managing the power conditioning step are needed to further reduce inefficiency and improve operating consistency.

BRIEF DESCRIPTION OF THE DRAWINGS

Various embodiments in accordance with the present disclosure will be described with reference to the drawings, in which:

FIG. 8 illustrates a process for utilizing backup power for improving power supply efficiency, in accordance with various embodiments;

FIG. 9 illustrates a second process for utilizing backup power for improving power supply efficiency;

FIG. 10 illustrates a third process for utilizing backup power for improving power supply efficiency; and FIG. 11 illustrates a fourth process for utilizing backup power for improving power supply efficiency.

DETAILED DESCRIPTION

In a modern datacenter, the continuity of power to servers and other electronic components can be maintained by employing redundant power supplies, including backup battery units (BBUs) and/or supercapacitors (SC), in combination with continuous power supplies such as externally-supplied high-voltage AC power that is routed through and conditioned at power supply units (PSUs). Due to the high power demands of datacenter systems, and the unpredictable nature of line power outages, backup power supplies in a modern datacenter are typically well-distributed through the datacenter architecture and have large capacities.

Likewise, PSUs in a modern datacenter are distributed, may be capable of rapid and safe line-switching between multiple sources, and can handle large output loads. However, the process of stepping current/voltage, power quality correction, and converting to DC power from an AC source incurs a degree of efficiency loss. This efficiency loss can vary depending on factors including, e.g., the output load on the PSU. The efficiency of a PSU is typically highest within a high-efficiency band that is less than the maximum rated output load of the PSU, and drops off at output loads that are high and low compared to the high efficiency band. In some PSU's, the high efficiency band may center at about 50% of the maximum rated output load, but may vary up to 80%, or higher than 80%, depending on the design and intended purpose of the specific PSU.

Embodiments described herein are directed to methods and systems of managing the output load on the PSUs by drawing power from an associated backup power source, such as a BBU or SC, in the absence of a power supply failure, to supplement the power supplied to downstream components, thus reducing the load on the PSU. In addition, various embodiments are directed to methods of monitoring efficiency losses in the PSU, predicting output load peaks and valleys, and supplementing PSU power based on these predicted load requirements to increase average efficiency over time.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
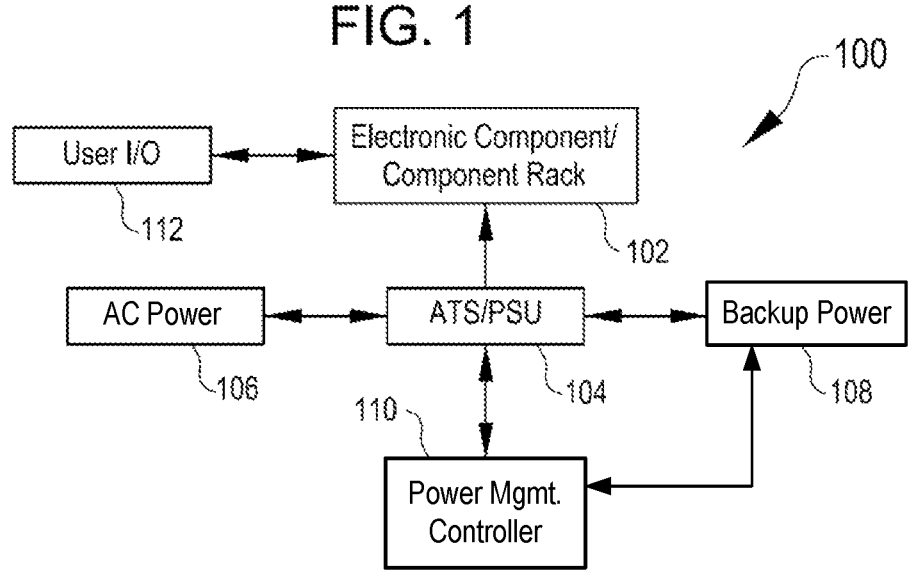
FIG. 1 is a high-level block diagram illustrating a system for powering electronic components, in accordance with various embodiments.

FIG. 1 is a high-level block diagram illustrating a system 100 for powering electronic components, in accordance with various embodiments. The system 100 includes electronic components 102, e.g. datacenter servers or server racks, switches, networking devices, or any other suitable set of electronic devices. Power is supplied to the system 100 by way of an AC power source 106, which can be a utility power source or other high voltage AC power supply, generator power, or other power source. The electrical power is routed through a PSU 104 (or ATS/PSU) which is responsible for converting and conditioning power from the AC power source 106 for use in the electronic components 102, and for managing power from multiple power supplies and/or any number of backup power supplies (e.g. BBUs or supercapacitors) 108. The backup power supply 108 is operable to provide power to the system through the PSU 104 in the event of a power loss event by compensating for partial or total power loss from the AC power source 106, and may also be operable to supplement the power provided to the PSU in tandem with the AC power source 106. Performance characteristics, efficiency, and capacity of the PSU 104 and backup power supply 108 can be monitored and controlled by a power management controller 110, which can include an onboard processor and memory, either separate from or in communication with the electronic components 102. The electronic components 102 (and/or the power management controller 110) can be controlled by and can communicate with users by any suitable user I/O device 112.

Figure 2:
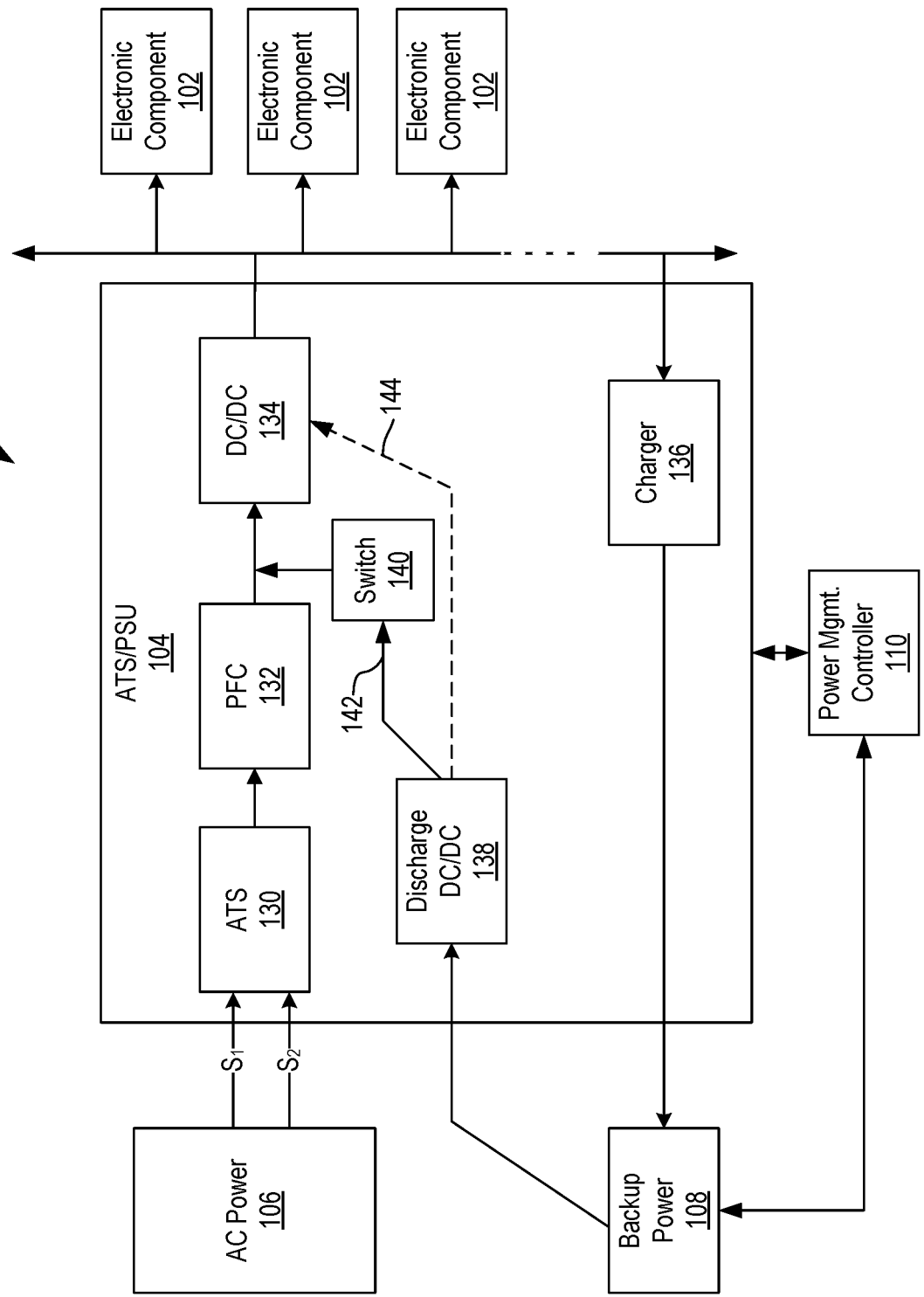
FIG. 2 is a block diagram illustrating an example approach to assisting a main power supply with backup power in accordance with the system of FIG. 1.

FIG. 2 is a block diagram illustrating an approach to compensating for a power supply with backup power in accordance with the system of FIG. 1, in which a backup power supply 108 (e.g. a BBU, an array of multiple BBU's, a supercapacitor or capacitor array, or other suitable battery power supply arrangement) is used in conjunction with the AC power source 106 for powering electronic components 102. Although shown as a single source, the AC power source 106 can refer to multiple and potentially many independent sources of power, including multiple utility sources, generator sources, the like. During normal operation, the AC power source 106, which can include externally supplied power (typically high-voltage AC power), supplies an amount of power to the electronic components 102 through a PSU 104. The PSU 104 can be assembled together as a cohesive device or can include multiple components across any suitable number of assemblies.

During normal operation, the PSU 104 is responsible for receiving power from the AC power source 106, which can include multiple lines (e.g. $S_1$, $S_2$, and potentially additional lines). In some embodiments, power originating from the power supply (or supplies) 106 first passes through an automatic transfer switch (ATS) which can select one or multiple input lines from the power supply, in order to ensure uninterrupted power supply from among multiple sources. Power from the ATS (130) may then be routed through a power factor controller (PFC) which can include circuits for changing the output power quality in multiple ways, including: reducing the harmonic distortion on the circuit, changing the number of phases (e.g., converting multiphase power into single-phase power), and/or converting AC power to DC power. Power may then be stepped down from a high voltage level to a lower voltage level at, e.g., a DC/DC converter 134. The stepped power can then be supplied to any suitable number of electronic components 102 by way of, e.g. a common rack power supply or rail, the number depending on the power rating of the PSU 104 and the projected demand by each set of electronic components 102.

In some modern systems, backup power from one or more BBU's can be provided in the event of power supply failure by, upon AC power supply failure, discharging backup power to the DC/DC converter stage 134 by way of path 144. In this manner, backup power is applied as a substitute for the AC power source 106. Applied backup power can be routed through a discharge DC/DC converter 138 that can be used to step the voltage of battery power from the backup power supply prior to passing through the DC/DC converter 134, or may be applied directly downstream to the electronic components 102.

In contrast, according to various embodiments of the present disclosure, backup power can instead be applied while the AC power supply is active. Supplemental backup power can be routed by way of path 142 from the backup power supply 108 through a switch 140 upstream of the DC/DC converter stage 134, and applied directly against the output load, thus reducing the effective output load on the PSU 104. In alternative embodiments, the supplemental backup power can bypass the PSU 104 and be supplied downstream of the DC/DC converter 134. The discharge rate of the backup power supply 108 may be controlled at the switch 140, by additional DC/DC converters, or from the backup power supply based on instructions from the power management controller 110, which can monitor power output or demand from the PSU 104 by the electronic components 102 and monitor capacity from the backup power supply 108. By routing power from the backup power supply 108 to downstream of the PSU components, backup power from the backup power supply 108 can directly offset the power output demand on the PSU 104 from the electronic components 102.

According to various embodiments, the backup power supply can also be electrically connected with a charger 136 that can draw excess power from the same circuit or rail as the electronic components 102, thus providing a feedback mechanism for excess power to be returned to the BBU. Although not shown, the backup power supply 108 can also have various other electrical connections for charging or diagnostics, including, e.g., a power source for charging that originates from the AC power source 106 or from another source of external power.

The overall efficiency of the PSU 104 can be described directly in terms of the output power over the input power from the power supply, and would trend toward 100% in a perfectly efficient system. However, the actual efficiency of the PSU 104 depends on efficiency losses at each component in series, i.e., the ATS 130, PFC 132 and DC/DC converter 134. Furthermore, the actual efficiency of the PSU 104 varies depending on the output load at any given moment.

Figure 3:
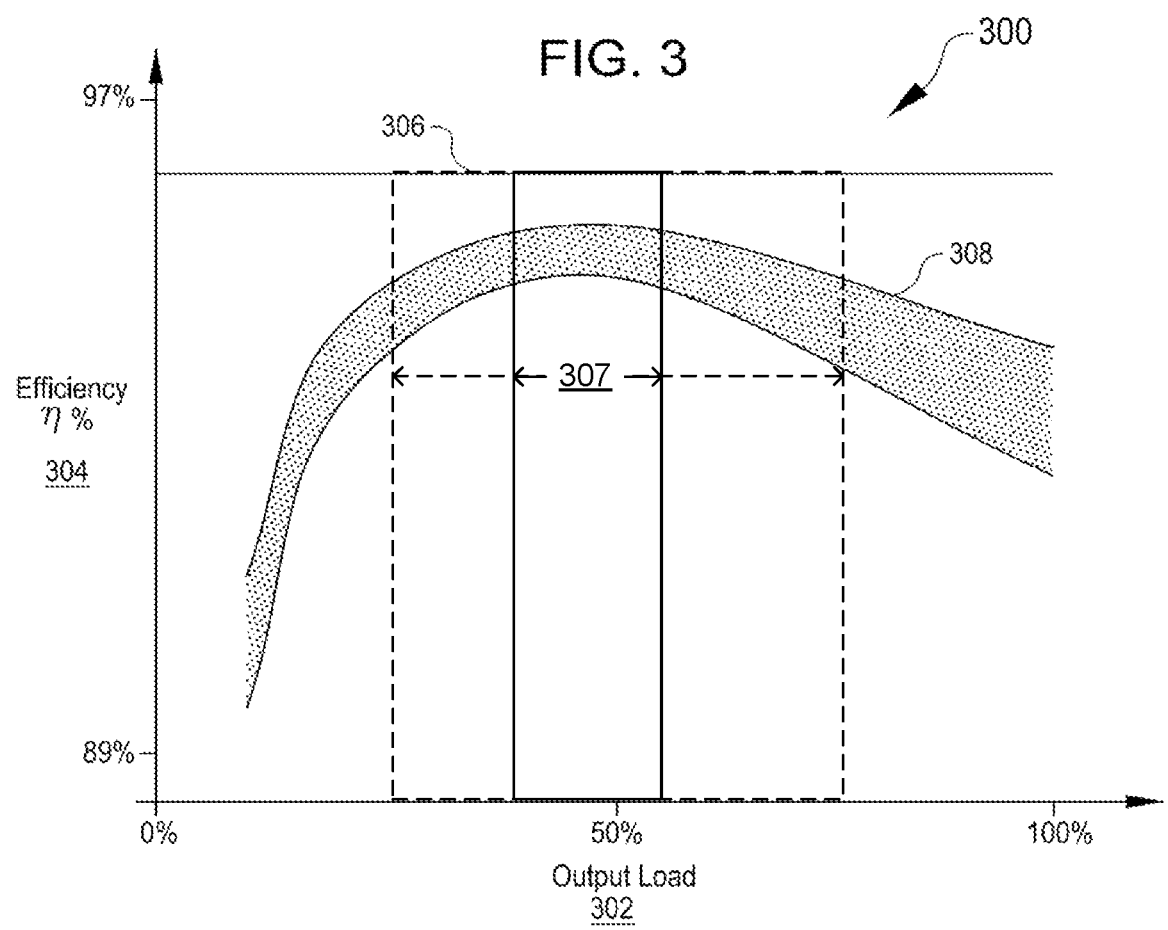
FIG. 3 is a chart illustrating an example range of efficiency curves for unassisted power supplies as a function of output load.

FIG. 3 is a chart 300 illustrating an example range of efficiency curves 308 for unassisted power supplies as a function of output load. The y-axis 304 describes efficiency as a percentage of the output load over the power supply, whereas the x-axis 302 describes the output load on the selected PSU's as a percentage of each PSU's maximum rated output load. As shown, total efficiencies for some known PSU's may vary from approximately 90% to 96%, with a significant variance depending on the precise amount of the output load. Thus, overall efficiency can approach an ideal or a target efficiency 306 in a high-efficiency band 307 of output loads at which the efficiency meets or exceeds a threshold. The threshold and the concomitant range of the high-efficiency band 307 may vary depending on the required overall efficiency for a given application and on the characteristics of the efficiency vs. load curve for particular equipment. For some commercial PSU's, the high-efficiency band for loading may be centered on approximately 50% of the rated output load, whereas the efficiency drops off when the PSU is subjected to a power draw that is above the optimal output load or below the rated output load. The specific range of the high-efficiency band for any given PSU may differ, and may be higher or lower than 50%, and may include a small range or a large range of the possible output loads. The principles described herein may be adapted and tuned for a variety of PSU's having different high efficiency bands.

By supplementing the power supplied downstream of the PSU 104 (FIGS. 1 and 2), the system 100 can change the output load seen by the PSU 104. In particular, if the output load is high compared to the high-efficiency band of a given PSU, the system can divert battery power from the Backup power supplies (108) to partially supply the electronic components 102, thus decreasing the effective output load back toward the high-efficiency band. Together, the use of the backup power supply in this fashion allows for the system 100 to utilize power from the AC power source 106 at an output load conducive to high efficiency, thus reducing overall draw on the AC power source 106. In contrast, if the output load is low compared to the high-efficiency band seen by the PSU, power can be drawn from downstream of the PSU 104, e.g. by charger 136 (FIG. 2), and used to recharge the backup power supply 108. The resultant increase in power draw can allow the system to again utilize the PSU at its high-efficiency band. The amount of power supplied by the backup power supply 108 can be varied by a variety of techniques, including, e.g., by one or more DC/DC converters (such as DC/DC converter 138), or by shedding BBU's from among a multi-BBU array so that fewer BBU's are concurrently supplying power.

Figure 4:
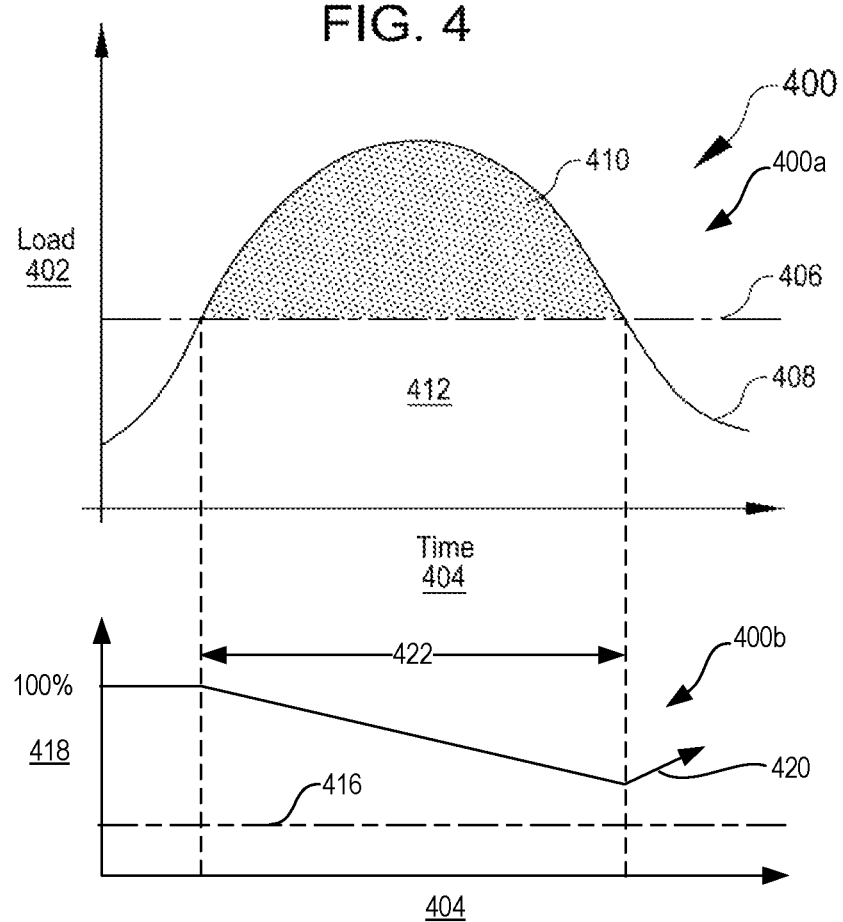
FIG. 4 is a chart illustrating a first example of a backup assisted power supply in accordance with the systems of FIGS. 1-2, and according to various embodiments of the present disclosure.

FIG. 4 is a chart 400 illustrating a first example of a battery compensated power supply in accordance with the systems of FIGS. 1-2, and according to various embodiments of the present disclosure. The chart 400 includes a load chart 400a that shows output load 402 on the Y-axis as a function of time 404, with a target load 406 representing an output load within a high-efficiency band for a PSU, and an output load curve 408 representing an actual, fluctuating load caused by power draw from electronic components that can exceed the target load. According to various embodiments, the system can utilize an AC power source to supply a base draw 412 up to the target load 406 throughout the loading cycle, and can utilize backup power to supply a peak draw 410, where the output load 408 exceeds the target load 406. As a result, power draw on the AC power supply through the PSU does not exceed the target load 406, thus obviating efficiency losses that would occur otherwise were the PSU to take an output power draw far above its high-efficiency band. The target load 406 can refer to an ideal load at which the efficiency for the PSU peaks, or can also refer to any suitable, predetermined threshold corresponding to a high-efficiency band of a PSU, e.g., an upper boundary of the efficiency band, or an output load value at which efficiency diminishes below a predefined threshold.

Figure 5:
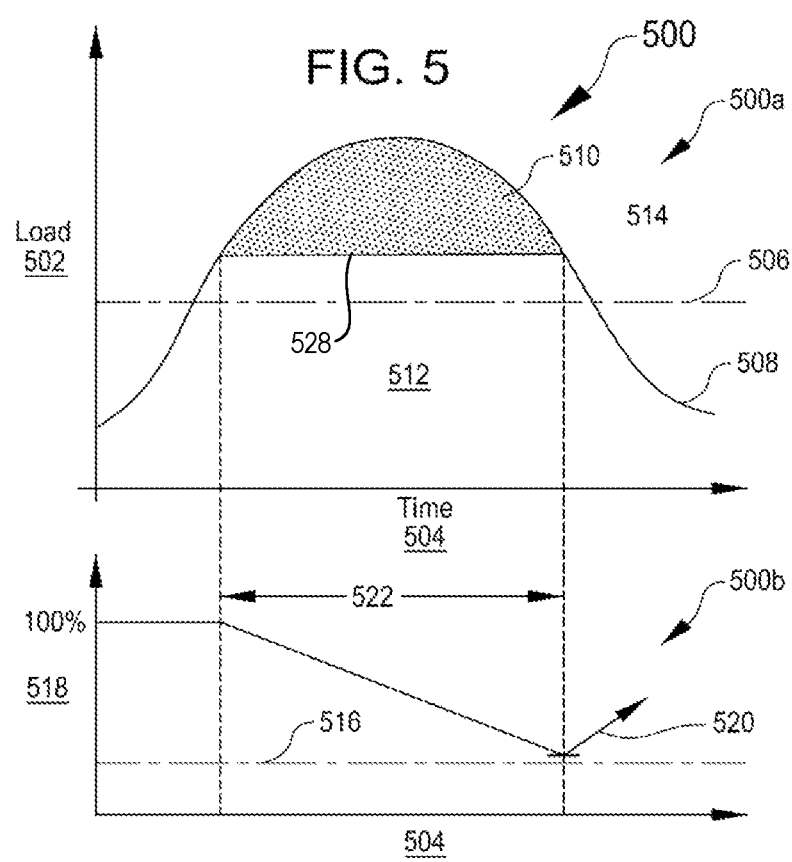
FIG. 5 is a chart illustrating a second example of a backup assisted power supply.

In FIG. 4, the load at which the system switched to using backup power is determined based on the target load 406. Backup capacity chart 400b shows the capacity 420 of a backup power supply on the Y-axis 418, also as a function of time 404. As shown, the backup capacity 420 diminishes with use over the duration 422 of the excess power draw, but is not limited by the minimum or critical capacity 416 of the backup power supply. However, in some embodiments, the threshold for using backup power may require consideration of backup capacity, e.g. where the backup power supply is a BBU or supercapacitor that must retain a minimum power level for emergency use, and where power draw in excess of a target load exceeds the capabilities of a backup power supply. For example, FIG. 5 is a chart 500 illustrating a second example of a battery compensated power supply, in which backup capacity limits the threshold for adding backup power supply compensation.

The chart 500 includes a load chart 500a that shows output load 508 on the Y-axis 502 as a function of time 504, with comparison to a flat, target load 506 representing a particular output load within a high-efficiency band for a PSU, and a variable output load curve 508 representing an actual, fluctuating load that can exceed the target load. According to various embodiments, the system can utilize backup power to supply a peak draw 510, where the variable output load curve 508 exceeds the target load 506 beyond an offset determined by backup capacity. In backup capacity chart 500b, the backup capacity 520 is shown on the Y-axis 518, also as a function of time 504. The system can determine a usable capacity of the backup power supply by subtracting a minimum or critical capacity 516 from the backup power supply's current level, whether that level is 100% or some fraction thereof. The system can predict the shape of the variable output load curve 508 over time and the duration 522 thereof, e.g. based on historical data of similar power draw events. Based on the predicted shape of the variable load and usable backup capacity, the system can then select a specific load or threshold 528 above which the Backup power supplies supply power to the electronic components. When the threshold 528 is selected correctly, the backup capacity curve 520 will approach without falling below the critical capacity 516. As a result, the total output load is divided into a peak load 510 and a base load 512. The primary power source is used to power the base load 512, which remains relatively close to the target load 506, while backup power is used to offset the peak load 510 where the load exceeds the high-efficiency band of the PSU.

Figure 6:
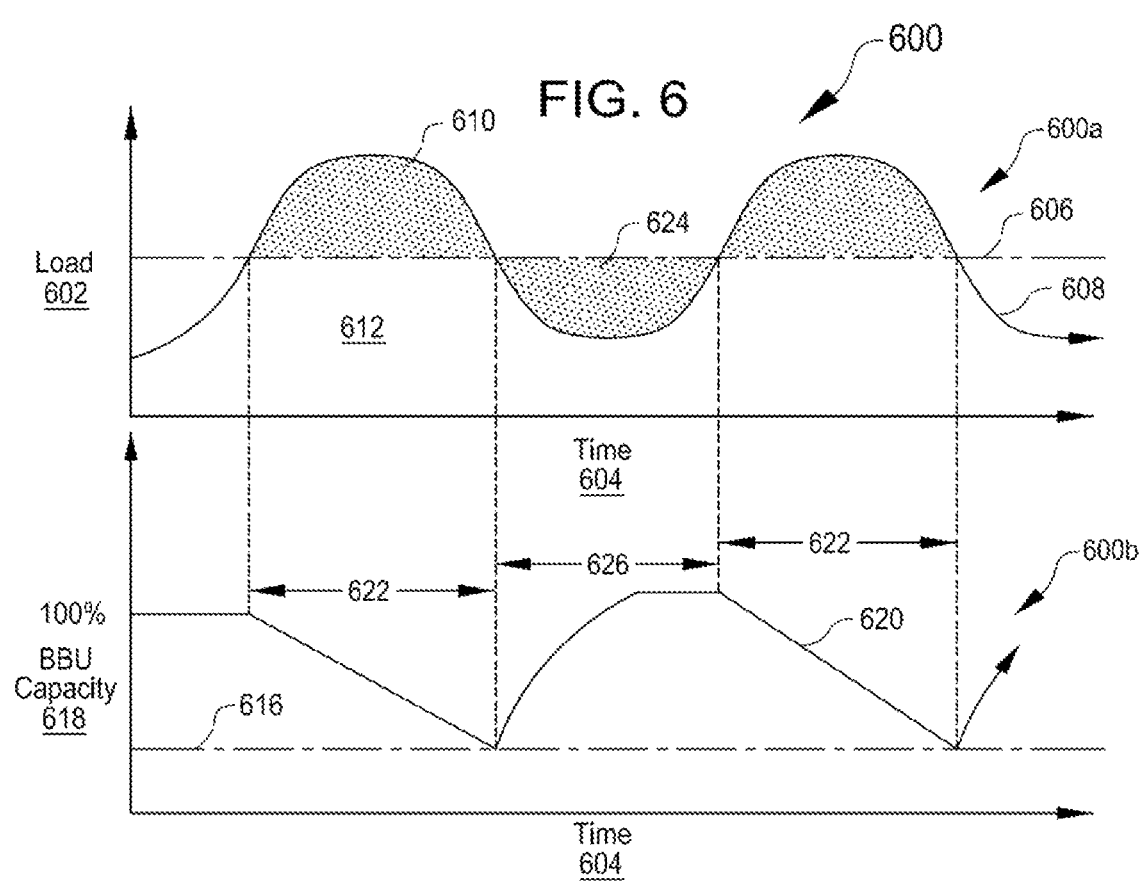
FIG. 6 is a chart illustrating a third example of a backup assisted power supply over periodic loading cycles.

The techniques described above can be used in conjunction with periodic output load cycles as well. For example, FIG. 6 is a chart 600 illustrating a third example of a battery compensated power supply over periodic loading cycles. The chart 600 includes a load chart 600a that shows an output load curve 608, with output load on the Y-axis 602 as a function of time 604, with comparison to a flat, target load 606 representing an output load within a high-efficiency band of output loads for a PSU. The output load curve 608 represents an actual, fluctuating load that can exceed the target load. In similar manner to the approach shown in FIG. 4, the system can utilize backup power to supply a peak draw 610, where the variable output load curve 608 exceeds the target load 606. The system can utilize the primary or AC power supply up to the target load 606. As a result, power draw on the PSU does not exceed the target load 606. The target load 606 can also refer to any suitable, predetermined threshold corresponding to a high-efficiency band of a PSU, e.g., an ideal load at which efficiency peaks, an upper boundary of an efficiency band in which actual efficiency meets or exceeds a target efficiency, or an output load value at which efficiency diminishes. As a result, the total output load is divided into a peak load 610 and a base load 612. The primary AC power source is used to power the base load 612, while supplemental power from the backup power supply is used to offset the peak load 610 where the load may exceeds the high-efficiency band of the PSU.

Backup capacity chart 600b shows backup capacity 620 as a function of time, capacity represented on the Y-axis 618. During peak load periods 622, the backup capacity 620 decreases as power is drawn from the backup power supply to supplement the AC power supply, but does not decrease below a reserve capacity 616. During lull periods 626, during which actual output load curve 608 is less than the target load 606, the backup capacity can increase as power is drawn from the AC power source to charge the backup power supply. This power draw can be visualized as a recharging load 624 that levels or partly levels the output load curve 608 bringing the output load curve closer to the target load 606. In a perfectly balanced system, supplemental assistance from the backup power supply during peak load periods 622 and lull periods 626 can be matched to even out the output load curve 608 seen by the PSU.

Figure 7:
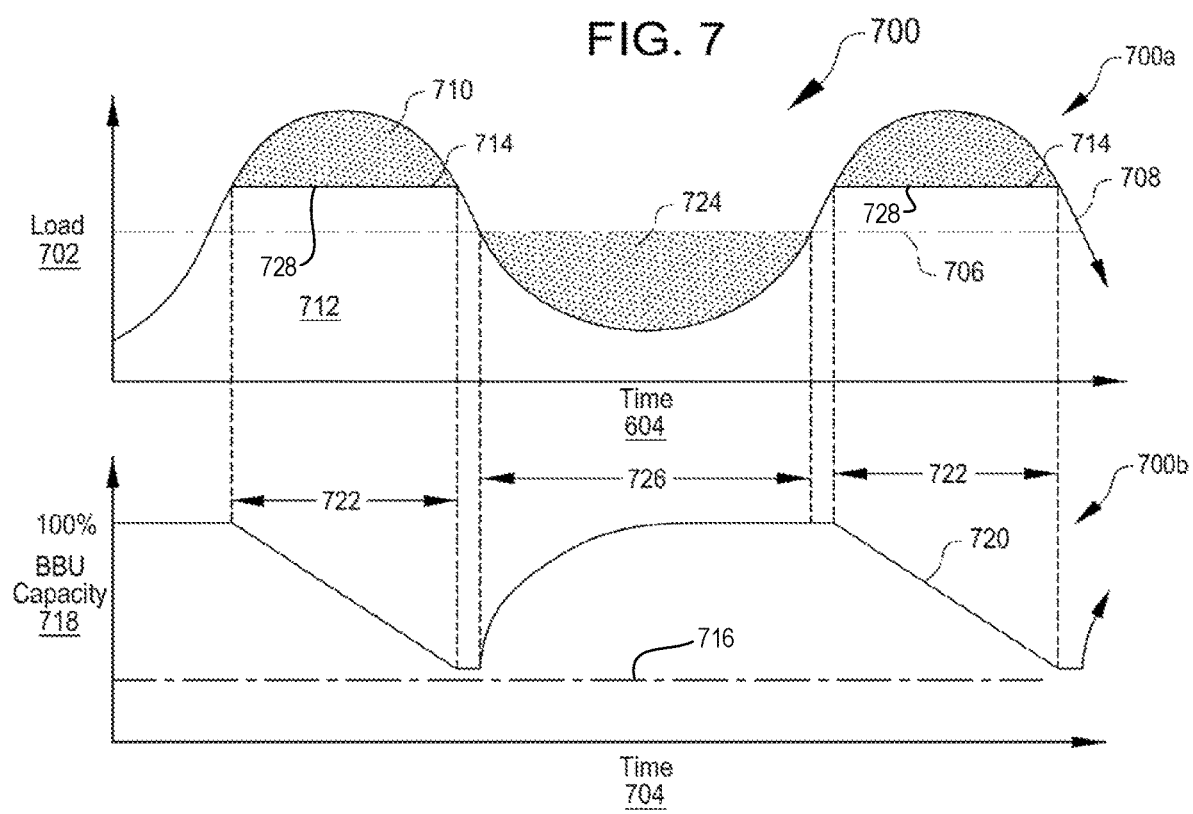
FIG. 7 is a chart illustrating a fourth example of a backup assisted power supply over periodic loading cycles.

FIG. 6 illustrates an ideal system in which the backup power supply is capable of supplementing all of the output load curve 608 above the target load 606. However, in a real system, the total power demand during peak loading periods may exceed the regular capacity of available BBU's or supercapacitors making up the backup power supply. FIG. 7 is a chart 700 illustrating a fourth example of a battery compensated power supply, in which backup capacity limits the threshold for adding backup power supply compensation over periodic peak loading periods.

The chart 700 includes a load chart 700a that shows output load curve 708, with output load represented on the Y-axis 702 as a function of time 704, and in comparison to a flat, target load 706 representing an output load that corresponds to a high-efficiency band for a PSU. Output load curve 708 represents an actual, fluctuating load that can exceed the target load. According to various embodiments, the system can utilize backup power to supply a peak draw, where the output load 708 exceeds the target load 706 beyond an offset determined by backup capacity. In a backup capacity chart 700b, the chart shows a backup capacity curve 720, with the backup capacity on the Y-axis 718, also as a function of time on the X-axis 704. The system can determine a usable capacity of the backup power supply based on its immediate capacity by subtracting a minimum or critical capacity 716. The system can predict the shape of each peak of the variable output load 708 over time over the durations of each peak output load period 722, e.g. based on historical data. Based on the predicted shape of the variable load curve 708 and usable backup capacity, the system can then select a specific load or threshold 728 above which the Backup power supplies supply power to the electronic components. When the threshold 728 is selected correctly, the backup capacity curve 720 will approach without falling below the critical capacity 716. As a result, the total output load is divided into a peak load 710 and a base load 712. The primary power source is used to power the base load 712, which remains relatively close to the target load 706, while backup power is used to offset the peak load 710 where the load exceeds the high-efficiency band of the PSU.

Lull periods 726 can occur between peak output loads 722, during which actual output load 708 is less than the target load 706. During lull periods 726, the system can draw power from the AC power supply to charge the BBU. This power draw can be visualized as a recharging load 724 that levels or partly levels the output load curve 708 bringing the output load curve closer to the target load 706. The power draw can be used to level the output load on the AC power supply to the target load 706 as shown; or alternatively, power can be drawn at a threshold (not shown) that differs from the target load.

FIGS. 8-11 illustrate various examples of processes for utilizing backup power to manage power supply to electronic components and to improve overall efficiency of the power supply. Some or all of the processes 800, 900, 1000, 1100 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

FIG. 8 illustrates a first process 800 for utilizing backup power for improving power supply efficiency, in accordance with various embodiments and in conjunction with the approach illustrated in FIG. 4. In the process 800, the system can receive an indication of an imminent or currently occurring period of peak output load in excess of a predetermined peak efficiency band (act 802). An indication of a currently occurring period of peak output load can be obtained by, e.g., monitoring the output load and comparing the output load to a known threshold; by comparing the output load to the AC power supply and detecting inefficiency; by detecting an increase in activity by the electronic components powered by the system, or similar methods. According to some embodiments, the indication of an imminent period of peak output load can be predictive, e.g., by monitoring the output load over time and in view of contextual events that precede periods of peak output load. For example, the system may predict a period of peak output load corresponding to a time of day (e.g., "prime time" hours, mornings, evenings); events pertaining to the specific use of the electronic components powered by the system (e.g., sales events for datacenter servers that power online shopping, release dates for servers that power online media, etc.); or any suitable combination of the above.

The system can then measure the excess output load over a predetermined ideal load or threshold to determine an output load gap (act 804). This step can be accomplished by measuring the output load directly, or can be determined by measuring the total efficiency of the PSU (e.g., by calculating efficiency based on the output power from the PSU and the power supplied to the PSU), and back-solving to determine the output load cap based on the change in efficiency. The backup power supply can continue to supplement the power supply for a duration of the peak output load (act 806), or until the backup capacity has fallen below a predefined level or critical level (act 808). In the event that backup capacity has fallen below a predefined level or critical level, the system can stop supplementing the power supply with backup power (act 810). If this occurs while the peak output load still exceeds the threshold, the system can draw additional power from the power supply to compensate, can throttle the electronic components drawing power, or can use other suitable methods for balancing the power supply and output load. While the peak output load exceeds the threshold (act 812), the system can iteratively measure the excess load and supplement the power supply. Once the peak output load falls to or below the threshold, the system can stop supplementing power by the backup power supply.

FIG. 9 illustrates a second process 900 for utilizing backup battery power for improving power supply efficiency in accordance with the approach illustrated in FIG. 5. In the process 900, the system can receive an indication of an imminent period of peak output load in excess of a predetermined threshold, which can be based on a peak efficiency band (act 902). The system can then predict the total power draw of the peak output load (i.e., the excess output load over a predetermined target load, the duration of the excess output load, and the shape of the curve defining the excess output load over time) (act 904). This determination can be made based on, e.g., historical data in conjunction with reliable predictive metrics. For example, in a database system that facilitates an online marketplace, a peak power draw on select servers can be predicted around a sales event based on past sales events, and adjusted based on known changes in user behavior.

The system can predict a peak power draw based on a wide variety of contextual events, including but not limited to: time of day; launch events for new games, shows, or movies supported by a server powered by the PSU; periodic analysis events for enterprise systems; stock trading periods for financial systems; and other industry-specific loading events. According to some embodiments, the system can also accommodate contextual information related to high external power demand. For example, the system may receive information pertaining to public demand for power, such as but not limited to heat waves or cold weather events that result in high power demand for heating, ventilation or air conditioning; or lighting and transit power requirements during mornings, evenings, and public events, etc. During periods of high external demand, the system can set a threshold or reduce a threshold on the output load so that supplemental power is supplied to offset demand for AC power, thus reducing consumption during periods of high external power demand.

The system can then determine whether the predicted total power draw exceeds the usable capacity of the backup power supply (act 906). If the predicted total power draw of the excess output load does not exceed the available capacity of the associated backup power supply, the system can proceed in a manner similar to that described in process 800 (FIG. 8) (act 908). However, in the event that the predicted total power draw does exceed the available capacity of the associated backup power supply, the system can instead determine a threshold based on the predicted output load such that a new total power draw, based on the difference between the predicted output load and the selected threshold, does not exceed the available capacity of the backup power supply (act 910). When the threshold is selected correctly, the backup capacity will approach without falling below the critical capacity, so that at least a minimum backup capacity is available in the event of power failure. The system can then supplement the main power supply by the backup power supply, or backup power supply, based on the new threshold rather than the predetermined threshold (act 912).

FIG. 10 illustrates a third process 1000 for utilizing backup battery power for improving power supply efficiency in accordance with the approach illustrated in FIG. 6. In the process 1000, the system can receive an indication of cyclic peak output loads in excess of a predetermined threshold corresponding to a peak efficiency band (act 1002). In a similar manner to that described above, the system can predict the total power draw corresponding to the excess output load over time (act 1004). The system may also predict the behavior of lulls in the output load in order to determine the amount by which the backup power supply can regain lost capacity between peak output cycles (act 1006). The amount by which the backup power supply can regain lost capacity can be determined as a function of a predicted time period between peak output cycles, a predicted availability of power for recharging the backup power supply between peak output cycles, and a predicted recharging rate of the backup power supply based on the available power.

When the peak output cycle begins, the system can respond by supplementing the power supply with backup power to offset the excess output load, thus maintaining the output load on the PSU within the high efficiency band, preferably at or near the target load (act 1008). The system can monitor the output load respond to unexpected changes in the actual output load compared to the predicted output load by, e.g., changing the draw on the backup power supply, changing the draw on the power supply, throttling performance of the electronic components, or any suitable combination of the above (act 1010). When the system detects that a peak output cycle has ended (act 1014), and the output load is lower than the target output load, the system can increase the draw on the power supply above the output load to recharge the backup power supply (act 1012). Depending on the predicted duration of each lull in the output load, the system may be able to fully or partially recharge the backup power supply.

FIG. 11 illustrates a fourth process 1100 for utilizing backup battery power for improving power supply efficiency in accordance with the approach illustrated in FIG. 7, where the excess power demand in a periodic peak output cycle exceeds the available backup capacity. In the process 1100, the system can receive an indication of cyclic peak output loads in excess of a predetermined peak efficiency band (act 1102). In a similar manner to that described above, the system can predict the total power draw corresponding to the excess output load over time (act 1104), and determine that the total power draw would exceed the available backup capacity (act 1106). As described above with respect to process 1000, the system may also predict the behavior of lulls in the output load in order to determine the amount by which the backup power supply can regain lost capacity between peak output cycles.

If the total power draw would exceed available backup capacity, the system can determine a threshold, based on the predicted behavior of the output load, that would result in a power draw consistent with the available backup capacity while minimizing inefficiency (act 1108). When the peak output cycle begins, the system can respond by supplementing the power supply with backup power, when the output load exceeds the threshold, thus maintaining the output load on the PSU within or near the high efficiency band (act 1110). The system can monitor the output load and respond to unexpected changes in the actual output load compared to the predicted output load by, e.g., changing the draw on the backup power supply, changing the draw on the power supply, throttling performance of the electronic components, or any suitable combination of the above (act 1112). When the system detects that the peak output cycle has ended (act 1116), and the output load is lower than the target output load, the system can increase the draw on the power supply above the output load to recharge the backup power supply (act 1114).

Various computing environments may be used, as appropriate, to implement various embodiments as described herein including web- or cloud-based computing environments, computing environments based on local controllers, or combinations of the above. User or client devices can include any of a number of general purpose personal computers, such as desktop or laptop computers running a standard operating system, as well as cellular, wireless and handheld devices running mobile software and capable of supporting a number of networking and messaging protocols. Such an environment also can include a number of workstations running any of a variety of commercially-available operating systems and other known applications for purposes such as development and database management. These workstations also can include other electronic devices, such as dummy terminals, thin-clients, gaming systems and other devices capable of communicating via a network and used for communicating with sensors, displays, actuators, and user interfaces, among other devices.

For example, user interfaces (such as user I/O module 112, FIG. 1) can include any appropriate device operable to send and receive requests, messages, or information over an appropriate network and convey information back to a user of the device. Examples of such devices include portable displays, personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used in conjunction with such a network can depend at least in part upon the type of network and/or environment selected. Protocols and components for communicating via such a network are well known and will not be discussed herein in detail. Communication over the network can be enabled by wired or wireless connections and combinations thereof.

Suitable computing environments can include, in various embodiments, a server and data store. It should be understood that there can be several servers, layers, or other elements, processes, or components, which may be chained or otherwise configured, which can interact to perform tasks such as obtaining data, processing said data, and communicating data or with users. For example, according to various embodiments, a controller such as power management controller 110 (FIG. 1) can include a server and/or a virtual machine emulated by a server. As used herein the term "data store" refers to any device or combination of devices capable of storing, accessing, and retrieving data, which may include any combination and number of data servers, databases, data storage devices, and data storage media, in any standard, distributed, or clustered environment. The server can include any appropriate hardware and software for integrating with the data store as needed to execute aspects of one or more applications for the client device, handling a majority of the data access and logic for an application. It should be understood that servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store can include a mechanism for storing data for reporting, analysis, or other such purposes. The data store is operable, through logic associated therewith, to receive instructions and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

A computing environment according to various embodiments can be a distributed computing environment utilizing several computer systems and components that are interconnected via communication links, using one or more computer networks or direct connections. However, it will be appreciated by those of ordinary skill in the art that the embodiments discussed above could operate equally well in a computing environment having fewer or a greater number of components, including systems operated under the control of a single computing device in communication with any suitable combination of the various sensors, input/output devices and/or actuators discussed herein.

Computing environments as discussed herein can include a variety of data stores and other memory and storage media as discussed above. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Suitable media can also include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including,"

and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system for controlling distribution of AC power and backup power for powering servers in a datacenter, the system comprising:
    servers;
    a main power supply electrically connected with the servers, wherein the main power supply has a maximum rated power output;
    one or more backup battery units (BBUs) electrically connected with the servers; and
    a controller configured with executable instructions to operate the one or more BBUs and:
        receive output load data corresponding to previous output loads drawn by the servers;
        predict an output load curve based on the output load data, wherein the output load curve is indicative of predicted output load values over time;
        determine an upper threshold output load for the main power supply based on the output load curve and an available energy capacity of the one or more BBUs, wherein a total energy supplied by the one or more BBUs, when the one or more BBUs is used in conjunction with the main power supply to output power matching the output load curve, matches the available energy capacity of the one or more BBUs when the main power supply is limited to outputting power equal to or less than the upper threshold output load, and wherein the upper threshold output load is equal to or less than 80 percent of the maximum rated power output of the main power supply;
        receive an indication that an output load on the main power supply by the servers exceeds the upper threshold output load; and
        cause the one or more BBUs to provide an amount of supplemental power to the servers in conjunction with the main power supply supplying power to the servers, wherein the amount of supplemental power corresponds to a difference between the output load and the upper threshold output load.

2. The system of claim 1, wherein the amount of supplemental power provided by the one or more BBUs is selected to bring the output load to within a predefined range of output loads that defines a target efficiency band of the main power supply.

3. The system of claim 1, wherein the controller is further configured with executable instructions to:
    determine, based on the output load data, a predicted total excess energy draw of the output load corresponding to when the output load exceeds the upper threshold output load; and
    select the amount of supplemental power based in part on the predicted total excess energy draw.

4. The system of claim 1, wherein the controller is further configured with executable instructions to:
    determine, based on the output load data, a predicted total excess energy draw of the output load corresponding to when the output load exceeds the upper threshold output load;
    determine whether the predicted total excess energy draw exceeds an available energy capacity of the one or more BBUs; and
    select the upper threshold output load so that the predicted total excess energy draw is equal to or less than the available energy capacity of the one or more BBUs.

5. The system of claim 1, wherein the controller is further configured with executable instructions to:
    receive an indication of repeating cycles of excess output load on the main power supply, whereby the output load by the servers exceeds the upper threshold output load;
    cause the one or more BBUs to provide the amount of supplemental power to the servers during a duration of each repeating cycle of excess output load; and
    cause the main power supply to recharge the one or more BBUs between each repeating cycle of excess output load.

6. A computer-implemented method, comprising:
    receiving output load data corresponding to previous output loads drawn by an electronic device;
    predicting an output load curve based on the output load data, the output load curve being indicative of predicted output load values over time;
    determining an upper threshold output load for a main power supply based on the output load curve and an available energy capacity of one or more backup battery units (BBUs), wherein a total energy supplied by the one or more BBUs, when the one or more BBUs are used in conjunction with the main power supply to output power matching the output load curve, matches the available energy capacity of the one or more BBUs when the main power supply is limited to outputting power equal to or less than the upper threshold output load, and wherein the upper threshold output load is equal to or less than 80 percent of a maximum rated power output of the main power supply;

detecting an output load in excess of the upper threshold output load on the main power supply supplying power to the electronic device; and in response to detecting that the output load exceeds the upper threshold output load, causing the one or more BBUs to provide an amount of supplemental power to the electronic device, wherein the amount of supplemental is based on a difference between the output load and the upper threshold output load.

7. The computer-implemented method of claim 6, further comprising:

detecting that the output load is less than the upper threshold output load; and in response to detecting that the output load is less than the upper threshold output load, causing the one or more BBUs to draw power from the main power supply to recharge the one or more BBUs.

8. The computer-implemented method of claim 6, wherein the upper threshold output load is within target efficiency band of the main power supply, wherein the target efficiency band comprises a range of output loads whereby the main power supply can provide power to the electronic device at greater than 96% efficiency.

9. The computer-implemented method of claim 6, further comprising:

predicting a total excess energy draw based on a difference between the output load and the upper threshold output load for a duration that the output load exceeds the upper threshold output load; and selecting the amount of supplemental power based on the predicted total excess energy draw.

10. The computer-implemented method of claim 9, further comprising:

determining whether an available energy capacity of the one or more BBUs meets or exceeds the total excess energy draw; and if the available energy capacity of the one or more BBUs does not meet or exceed the total excess energy draw, selecting the amount of supplemental power based on the available energy capacity of the one or more BBUs.

11. The computer-implemented method of claim 6, further comprising:

causing the one or more BBUs to stop providing power to the electronic device when an available energy capacity of the one or more BBUs falls below a predetermined minimum energy capacity.

12. The computer-implemented method of claim 6, further comprising:

receiving an indication of repeating cycles of excess output load on the main power supply, whereby the output load by the electronic device is predicted to exceed the upper threshold output load;

selecting a threshold output load based on the upper threshold output load;

if the output load exceeds the upper threshold output load, causing the one or more BBUs to provide the amount of supplemental power to the electronic device; and if the output load is less than the upper threshold output load, causing the one or more BBUs to draw power from the main power supply to recharge the one or more BBUs.

13. The computer-implemented method of claim 12, further comprising:

selecting the upper threshold output load based on the predicted output load curve and an available energy capacity of the one or more BBUs such that the amount of supplemental power provided by the one or more BBUs results in a total energy supplied by the one or more BBUs to be less than or equal to the available energy capacity of the one or more BBUs.

14. The computer-implemented method of claim 6, further comprising:

causing the one or more BBUs to iteratively adjust a rate at which the amount of supplemental power is provided based on the output load.

15. A system, comprising:

a controller configured with executable instructions to operate one or more backup battery units (BBUs) and:

receive output load data corresponding to previous output loads drawn by an electronic component;

predict an output load curve based on the output load data, wherein the output load curve is indicative of predicted output load values over time;

determine an upper threshold output load for a main power supply based on the output load curve and an available energy capacity of one or more backup battery units (BBUs), wherein a total energy supplied by the one or more BBUs, when the one or more BBUs are used in conjunction with the main power supply to output power matching the output load curve, matches the available energy capacity of the one or more BBUs when the main power supply is limited to outputting power equal to or less than the upper threshold output load, and wherein the upper threshold output load is within a target efficiency band of the main power supply, and wherein the upper threshold output load is equal to or less than 80 percent of a maximum rated power output of the main power supply;

receive an indication that a load, by the electronic component on the main power supply, exceeds the upper threshold output load; and cause the one or more BBUs to provide an amount of supplemental power to the electronic component, wherein the amount of supplemental power corresponds to a difference between the load and the upper threshold output load.

16. The system of claim 15, wherein the controller is further configured with executable instructions to:

predict a total energy draw of the load for a duration during which the load exceeds the upper threshold output load; and select the amount of supplemental power based on the predicted total energy draw.

17. The system of claim 15, wherein the controller is further configured with executable instructions to:

predict a total energy draw of the load for a duration during which the load exceeds the upper threshold output load;

determine whether the predicted total energy draw exceeds an available energy capacity of the one or more BBUs; and select the amount of supplemental power based on the available energy capacity of the one or more BBUs.

18. The system of claim 15, wherein the controller is further configured with executable instructions to:

receive an indication of repeating cycles of excess load on the main power supply in excess of the upper threshold output load;

cause the one or more BBUs to provide the amount of supplemental power to the electronic component during a duration of each repeating cycle of excess load; and cause the one or more BBUs to draw power from the main power supply to recharge the one or more BBUs between each repeating cycle of excess load.

19. The system of claim 15, wherein the one or more BBUs comprises a supercapacitor.

* * * * *